United States Patent [19]

Jeon

[11] Patent Number: 5,159,439
[45] Date of Patent: Oct. 27, 1992

[54] CIRCUIT FOR CONTROLLING DELAY TIME BETWEEN LUMINANCE AND CHROMINANCE SIGNALS

[75] Inventor: Jin-kyu Jeon, Kyunggi, Rep. of Korea

[73] Assignee: Samsung Electronics Co., Ltd., Kyunggi-do, Rep. of Korea

[21] Appl. No.: 712,725

[22] Filed: Jun. 10, 1991

[30] Foreign Application Priority Data

Jun. 30, 1990 [KR] Rep. of Korea .................. 90-9525

[51] Int. Cl.$^5$ ........................................... H04N 9/455
[52] U.S. Cl. ...................................... 358/17; 358/19
[58] Field of Search .................. 358/17, 19, 20, 150, 358/158, 325, 326

[56] References Cited

U.S. PATENT DOCUMENTS 4,344,075  8/1982  Rudy ................................. 358/19
4,485,395 11/1984  Warren .............................. 358/17

FOREIGN PATENT DOCUMENTS 57-73582  5/1982  Japan ................................. 358/19

Primary Examiner—James J. Groody
Assistant Examiner—Kim Yen Vu
Attorney, Agent, or Firm—Cushman, Darby and Cushman

[57] ABSTRACT

A circuit for automatic control of delay time between luminance and chrominance signals is disclosed. The delay time control circuit of the present invention comprises: a clock pulse generator that passes a certain number of clock pulses during a period of time between the positive-going edge of the horizontal synchronizing signal from a horizontal synchronizing separator and the leading edge of the color burst signal from a color burst signal separator; a comparator that compares the number resultant clock pulses to a reference value and determines which signal (the luminance or the chrominance signal) is delayed and the length of the delay time; a luminance delay circuit and a chrominance delay circuit that delay the luminance and chrominance signal respectively according to outputs of the comparator; and a luma/chroma mixer that mixes the delayed luminance and chrominance signals. Therefore, the present invention improves picture quality by adjusting the delay time between the luminance and chrominance signals which occur in various kinds of VTR's and video tapes.

3 Claims, 2 Drawing Sheets

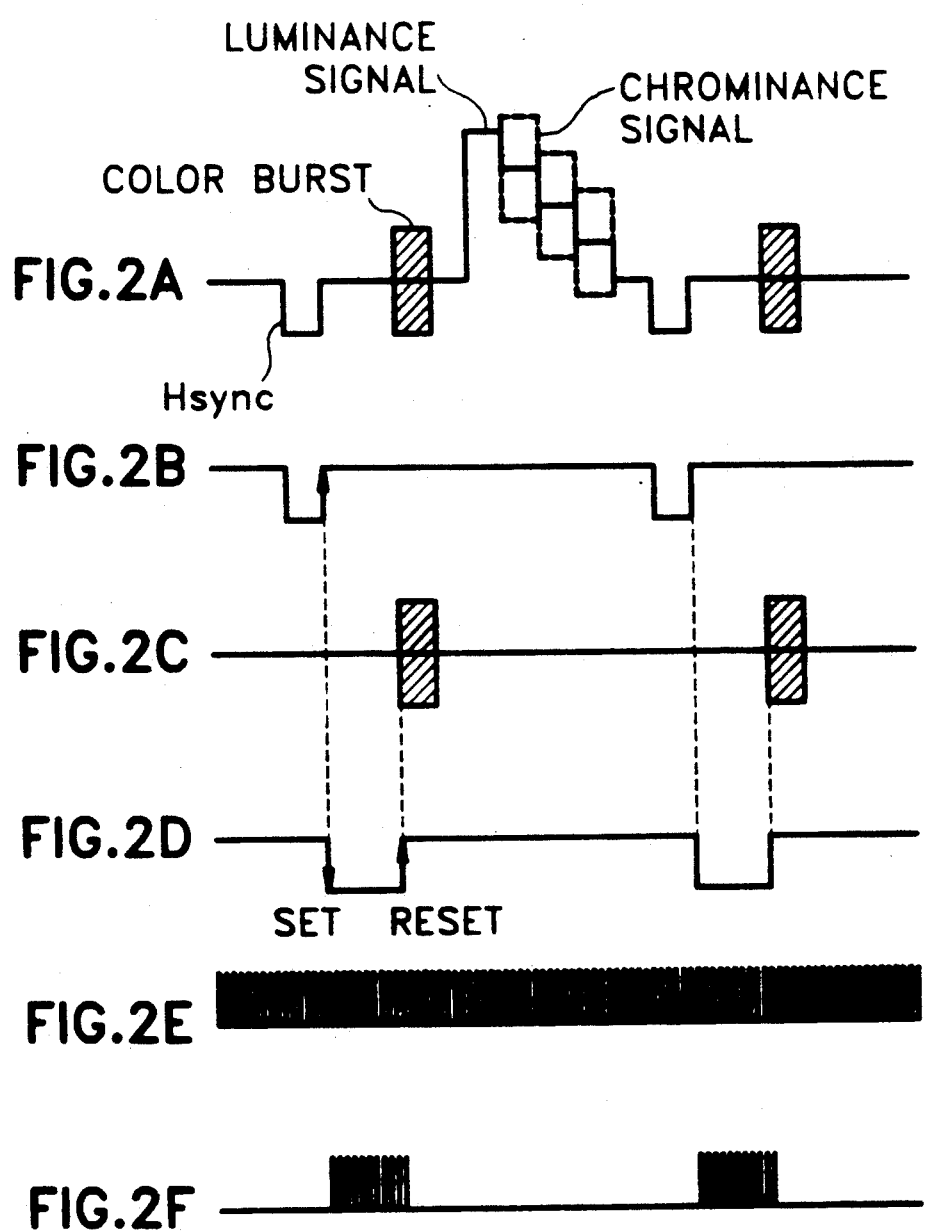

CIRCUIT FOR CONTROLLING DELAY TIME BETWEEN LUMINANCE AND CHROMINANCE SIGNALS

FIELD OF THE INVENTION

This invention relates to a circuit for automatically, controlling delay time between luminance and chrominance signals. More particularly, this invention relates to a circuit that can retrieve clear pictures by automatically controlling delay time between luminance and chrominance signals according to a video signal's recorded condition in various VTRs.

BACKGROUND OF THE INVENTION

Generally, in the field of VTR technology, when a user records a video signal on a VTR and plays back the recorded video tape on the same VTR, related control circuitry of the VTR minimizes the delay time between the luminance and chrominance signals without manual control. Therefore, when a user records and plays back a video signal on a single VTR, reproduction of the video signal without any delay time is possible. However, the market provides VTRs with slightly varying video signal processing units. Therefore, when a recorded video tape in one VTR is played back on another VTR, there occurs a slight difference in delay time between the luminance signal and the chrominance signal which results in deteriorated picture quality. In addition, video tapes on the market consist of slightly varying tape formats, so even in the same VTR, when a user uses different kinds of video tapes, the delay time between luminance signal and chrominance signal will still vary somewhat. This also deteriorates picture quality.

SUMMARY OF THE INVENTION

The present invention is devised to solve the above-stated problems. It is an object of the present invention to provide an automatic delay time control circuit that, when a video signal recorded on one VTR is played back on another VTR, or when different video tapes are played on the same VTR, enables the display of sharp images without duplicating the luminance and chrominance signals but by delaying them by an automatically derived delay time.

To achieve the above stated object, the present invention provides a circuit for controlling a delay time between a luminance signal and a chrominance signal in a video signal processing system, comprising:
- a horizontal synchronizing signal separator that receives a composite video signal and separates the horizontal synchronizing signal;
- a color burst signal separator that receives the composite video signal and separates the color burst signal;
- a clock pulse generator that receives a clock signal CLK at the clock terminal and outputs a predetermined number of pulses occurring between the positive edge of the horizontal synchronizing signal and the positive edge of the color burst signal;
- a comparator that detects the delay time between luminance signal and chrominance signal by comparing the signal outputted from the clock pulse generator with a reference signal;
- a luminance signal delay means that receives the clock signal and a luminance signal and delays it according to the signals outputted from the comparator;
- a chrominance signal delay means that receives the clock signal and a chrominance signal and delays it according to the signals outputted from the comparator; and
- a luminance and chrominance signal mixer that mixes the luminance signal and the chrominance signal outputted from the luminance signal delay means and the chrominance signal delay means.

BRIEF DESCRIPTION OF THE DRAWINGS

FIGS. 2A through 2F are waveform diagrams illustrating the operation of the delay time control circuit shown in FIG. 1.

DETAILED DESCRIPTION OF THE INVENTION

Figure 1:
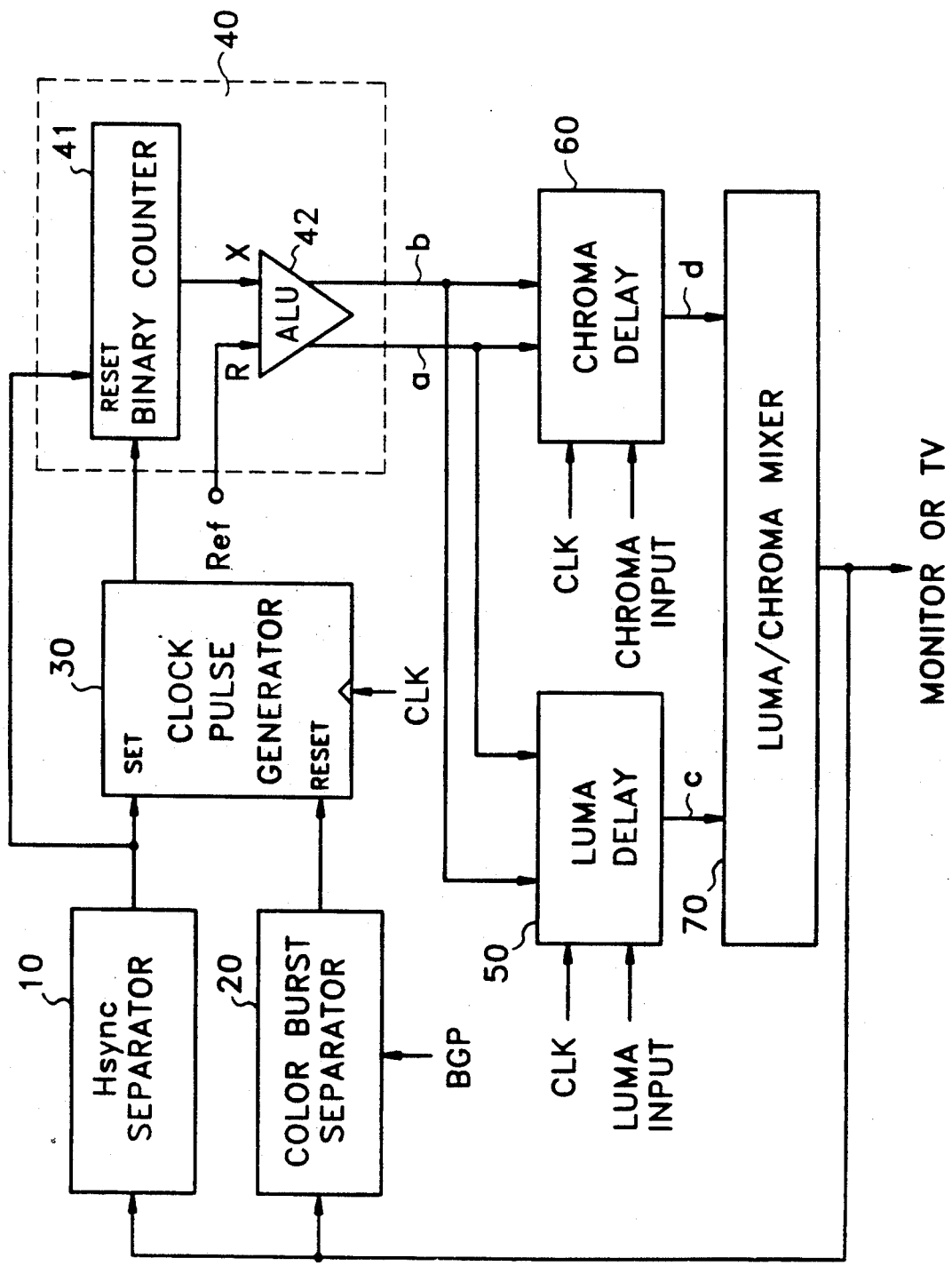
FIG. 1 is a block diagram schematically showing a delay time control circuit of the present invention which controls the delay time between a luminance signal and a chrominance signal.

Hereinafter, a preferred embodiment of the present invention is explained in reference to the attached drawings.

FIG. 1 is a block diagram of the delay time control circuit of the present invention. An Hsync separator 10 separates the Hsync signal, which is to be used as a reference signal to detect the delay time between the luminance and chrominance signals, from the final video output signal outputted from a luminance and chrominance signals mixer 70.

A color burst signal separator 20 also receives the final video output signal outputted from the luminance and chrominance signals mixer and separates the color burst signal. The color burst signal is then used as a comparison signal for detecting the delay time between the luminance and chrominance signals according to a burst gate pulse BGP signal fed from a chrominance signal processing circuit which is not shown in the drawing.

Meanwhile, a clock pulse generator 30 receives output signals from the Hsync separator 10 and the color burst signal separator 20, and performs selective pulse generation by initiating pulse generation at the rising edge of the Hsync pulse and ending pulse generation at the leading edge of the color burst signal.

Next, a comparator 40 converts the output pulses from clock pulse generator 30 into binary data in binary counter 41. The binary data is then fed to an arithmetic logic unit (hereinafter referred to as ALU) 42.

At this time, the ALU 42 compares the output from binary counter 41 with a predetermined reference value R and feeds the compared values a and b into a luma delay circuit 50 and a chroma delay circuit 60, where a is a sign bit value and b is a delay value. If the output value X from binary counter 41 is larger than the reference value R, the sign bit value a is outputted as "1" and if X is smaller than R, the value is outputted as "0". The delay value b is the converted difference in pulses and is fed to luma and chroma signal delay circuits 50 and 60. In other words, the delay value b is the difference between the reference signal R and value X outputted from the binary counter 41. In addition, the Hsync signal from the Hsync separator 10 is fed into the reset terminal of the binary counter 41 to be used by the comparator 40 so that one comparison is carried out every horizontal scanning period 1H. Next, if we assume that when output a from comparator 40 is "1", then the luminance signal is set to lag the chrominance signal, and chrominance signal delay circuit 60 receives the chrominance signal and carries out a increases the delay of the chrominance signal by the number of pulses in output b only when output a is "1", thereby delaying the chrominance signal as long as desired. Here, each group of delay value pulses is of a number proportional to the time delay of the luminance signal with respect to the chrominance signal.

The clock pulse CLK is of a high frequency and is used as a reference in processing chrominance signals or luminance signals through the chroma and luma delay circuits 50 and 60 with nearly no loss.

Meanwhile, the luminance signal delay circuit 50 operates similarly to and in a complimentary fashion with the above-mentioned chrominance signal delay circuit 60. Therefore, when output a is low and the chrominance signal delay circuit 60 operates without any signal delay, the chroma delay circuit 60 delays the chrominance signal. At this time, the number of pulses in each grouping of the delay value b is proportional to the amount of time that the luminance signal leads the chrominance signal and increases the delay according to the number of pulses, delaying the luminance signal as long as desired.

Accordingly, chrominance signal d and luminance signal c outputted from the chroma delay circuit 60 and the luma delay circuit 50 respectively, are mixed in the luma/chroma signal mixer 70 and the final video output signal is supplied to a monitor or TV.

Based on the above interconnections, operation of the embodiment of the present invention will be explained with reference to FIG. 1 and FIG. 2.

In FIG. 1, the signal fed to Hsync separator 10 and color burst separator 20 is the same composite of luminance and chrominance signals that is finally supplied as a video signal to a monitor or TV. FIGS. 2A through 2F illustrate the operation of each circuit component of the present invention using this signal.

FIG. 2A shows the composite luminance and chrominance signals as a final outputted video signal. FIG. 2B shows the Hsync signal separated by Hsync separator 10. FIG. 2C is a waveform diagram of the color burst signal separated by color burst signal separator 20. FIG. 2D is a waveform useful illustrating the generation of clock pulses by the clock pulse generator 30 by selectively passing the clock signal CLK only during the time between the set signal (which is the positive going edge of the Hsync pulse), and the reset signal (which is the leading edge of the color burst signal). FIG. 2E illustrates the clock pulse CLK. FIG. 2F is a waveform diagram that illustrates the resulting number of pulses passed through the clock pulse generator 30. This number of pulses increases when the chrominance signal lags the luminance signal and decreases when the luminance signal lags the chrominance signal.

Meanwhile, binary counter 41 of comparator 40 counts this number of pulses to generate output value X. ALU 42 then compares a reference value R with output value X to provide values a and b to the luminance signal delay circuit 50 and chrominance signal delay circuit 60. Here, output a from ALU 42 can be either high or low.

In the present invention, when the luminance signal is to be delayed, that is, when $X-R<0$, output a is set high. When the chrominance signal is to be delayed, that is, when $X-R\geq0$, output a is set low. Reference value R is a binary value obtained by converting the number of pulses generated when the delay time between luminance and chrominance signals is zero. Accordingly, when $X-R\geq0$, because output X from binary counter 41 is larger than value R (the value when delay time between luminance signal and chrominance signal is zero), the chrominance signal lags the luminance signal. When $X-R<0$, the luminance signal lags the chrominance signal and the number of outputted pulses from clock pulse generator 30 decreases compared to the former condition.

Output b from ALU 42 is a value obtained by converting the value of {X−R{ into pulses. Therefore, when {X−R{ is large, a large number of pulses are outputted, and when {X−R{ is small, a small number of pulses are outputted. When delay time between the luminance and chrominance signals becomes zero, X−R also becomes zero and the delay value is not outputted.

Consequently, when the delay value b is not outputted from comparator 40, the system is regarded as being in a "perfect" state having no delay time between the luminance and chrominance signals, and the luma delay circuit 50 and the chroma delay circuit 60 both transfer their respective signals without any delay to the luma/chroma mixer 70 maintaining the states of the respective input signals.

Next, when the delay value b is outputted from comparator 40 and the sign bit value a is high, the luminance signal is delayed and chroma delay circuit 60 delays the chrominance signal by the number of pulses in the delay value and outputs the result.

However, when the delay value b is outputted from comparator 40 and the sign bit value a is low, the chrominance signal is delayed and the luma delay circuit 50 delays the luminance signal by the number of pulses in the delay value and outputs the result.

Due to the inescapable fact that even the same models of VTR's and video signal recording devices are manufactured with subtle differences, the present invention for controlling delay time between luminance and chrominance signals will prevent deterioration of picture quality caused by this undesirable delay time by automatically controlling it during the processing of the video signal.

What is claimed is:

1. A circuit for controlling delay time between a luminance signal and a chrominance signal in a video signal processing system, comprising:

a horizontal synchronizing signal separator that receives a composite video signal and separates out the horizontal synchronizing signal;

a color burst signal separator that receives said composite video signal and separates out the color burst signal;

a clock pulse generator that receives a clock signal CLK and outputs an output signal having a number of pulses indicative of a period of time between a positive-going edge of the separated horizontal synchronizing signal and a leading edge of the separated color burst signal;

a comparator that detects delay time between the luminance and chrominance signals by comparing the output signal from said clock pulse generator to a reference value, the comparator outputting an output indicative of said delay time;

a luminance signal delay circuit that receives the clock signal CLK and the luminance signal, and delays said luminance signal according to the output from said comparator;

a chrominance signal delay circuit that receives the clock signal CLK and the chrominance signal, and delays said chrominance signal according to the output from said comparator; and a chrominance/luminance mixer that combines the delayed luminance and chrominance signals from said luminance and chrominance signal delay circuits to form said composite video signal.

2. A circuit for controlling delay time between a luminance signal and a chrominance signal as claimed in claim 1, wherein said comparator comprises:

a binary counter that receives the output signal of said clock pulse generator and performs binary counting to output a counted binary output value;

an arithmetic logic unit that received the reference value and the counted binary output value to output both a sign bit value and a delay value, the sign bit value being indicative of whether the counted value is larger than the reference value, the delay value consisting of a binary output value corresponding to the delay time between the chrominance and luminance signals;

a reset terminal of said binary counter receiving the separated horizontal synchronizing signal so that the delay time between luminance signal and chrominance signal is measured once every horizontal scanning period of the composite video signal.

3. A circuit for controlling delay time between a luminance signal and a chrominance signal as claimed in claim 2, wherein said reference value inputted to said comparator is a binary value corresponding to a number of pulses generated when the delay time between the luminance and chrominance signals is zero.

* * * * *